(12) United States Patent
Fellingham et al.

(10) Patent No.: US 6,603,840 B2
(45) Date of Patent: Aug. 5, 2003

(54) TECHNIQUE FOR LINKING TELEPHONY AND MULTIMEDIA INFORMATION

(75) Inventors: Paul J Fellingham, Holmdel, NJ (US); Christopher P Gilboy, Freehold, NJ (US)

(73) Assignee: AT&T Corp., New York, NY (US)

( * ) Notice: Subject to any disclaimer, the term of this patent is extended or adjusted under 35 U.S.C. 154(b) by 42 days.

(21) Appl. No.: 09/731,137

(22) Filed: Dec. 6, 2000

(65) Prior Publication Data

US 2002/0067812 A1 Jun. 6, 2002

(51) Int. Cl.[7] .............................................. H04M 11/00
(52) U.S. Cl. ................ 379/93.23; 379/93.25; 379/90.01
(58) Field of Search ........................... 379/93.23, 93.25, 379/93.17, 90.01, 142.01, 142.07, 142.15, 142.17, 142.06, 88.17

(56) References Cited

U.S. PATENT DOCUMENTS

| | | | | | |
|---|---|---|---|---|---|
| 5,724,412 | A | * | 3/1998 | Srinivasan | 379/93.23 |
| 6,097,793 | A | * | 8/2000 | Jandel | 379/93.23 |
| 6,141,413 | A | * | 10/2000 | Waldner et al. | 379/93.23 |
| 6,243,443 | B1 | * | 6/2001 | Low et al. | 379/88.17 |

* cited by examiner

Primary Examiner—Stella Woo

(57) ABSTRACT

The parties (12, 14) to a telephone call can exchange multimedia information by sending each other a URL that identifies the party's information. Each party may communicate its URL to the other party in the form of a caller identification message for receipt by the other party on a caller identification device (18) connected to computer (20). Upon receipt of the URL, the computer will access the Internet to retrieve the multimedia information corresponding to the URL. Rather than communicate its URL in the form of a caller identification message, each party may communicate its URL to the other in a call set-up signaling message in connection with an Internet Protocol telephone call.

19 Claims, 7 Drawing Sheets

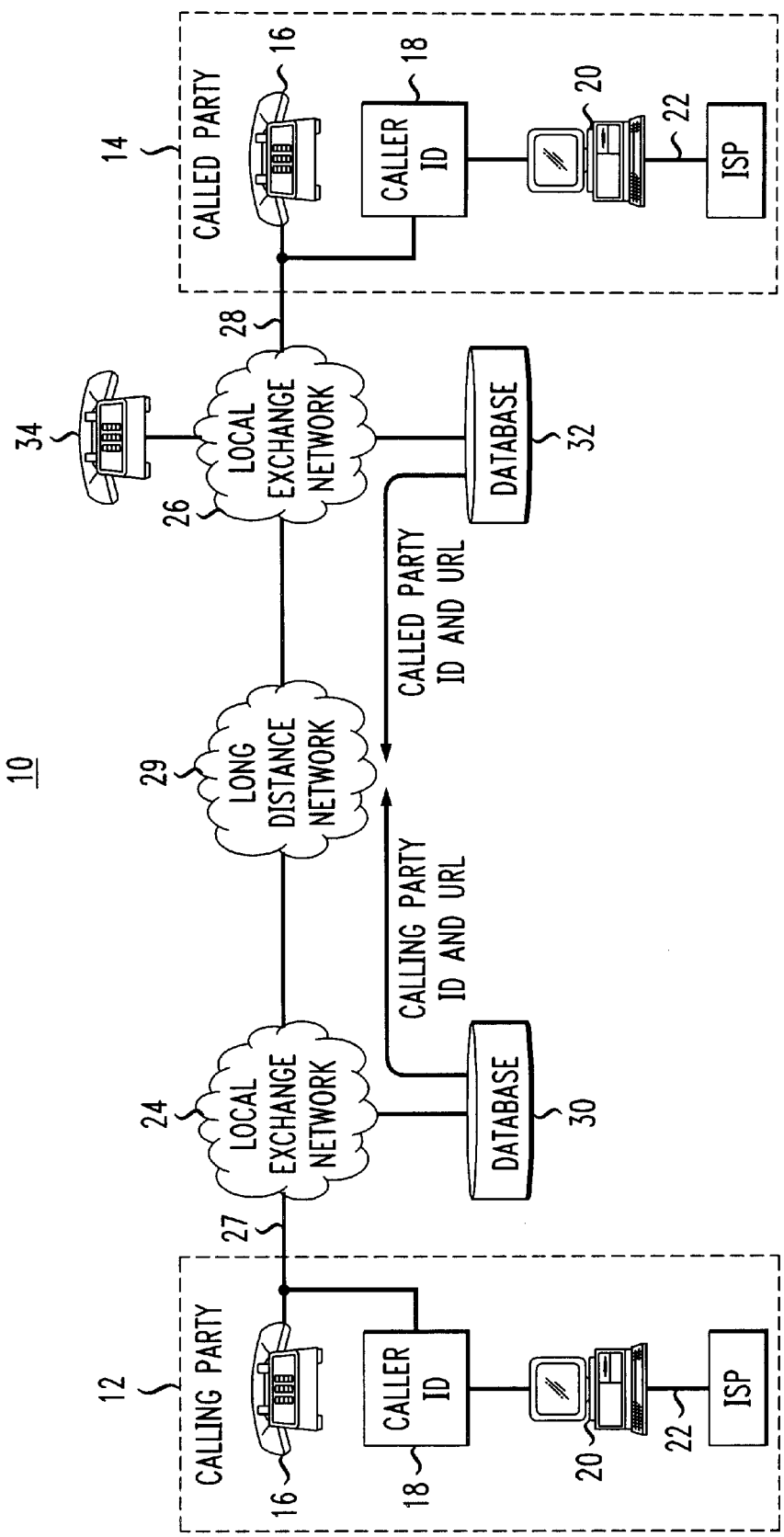

400

TECHNIQUE FOR LINKING TELEPHONY AND MULTIMEDIA INFORMATION

TECHNICAL FIELD

This invention relates to a technique for enabling the parties to a telephone call to exchange multimedia information during the call.

BACKGROUND ART

There exists a trend in telephony towards multimedia communication among the parties to a telephone call to allow the parties to exchange not only voice, but text and video as well. Telecommunications carriers, such as AT&T, currently support standards, such as the H.323 standard promulgated by the International Telecommunications Union, that are directed to the exchange of multimedia information among the parties to a telephone call. Unfortunately, much work remains to actually implement communications services that support such proposed standards.

Thus, there is a need for a simple solution that readily permits the parties to a telephone call to share multimedia information.

BRIEF SUMMARY OF THE INVENTION

Briefly, in accordance with a preferred embodiment of the invention, a method is provided for enabling the parties to a telephone call to exchange multimedia information. The method commences upon receipt in a telecommunications network of a telephone call launched by a calling party to at least one called party. In response to the call, there is established at least one Universal Resource Locator that identifies multimedia information for at least one of the parties to the call. For example, the network could establish the URL for each of the calling and called parties by querying one or more databases in response to the receipt of the number of the calling party and the dialed number of the called party, respectively. The URLs of the calling and called parties obtained from the network database are forwarded to the called and calling parties, respectively, in a caller Identification (ID) message sent to each party. Rather than query a network database, the calling and/or called parties could provide URLs to each other directly. For example, in the event the called party comprises a conference bridge employed in connection with conference call services, a call from a calling party received at the bridge would trigger a query to a database connected to the bridge to obtain a URL associated with a specific conference call. In the case of an Internet Protocol (IP) telephone call, the calling party launching the call may include an associated URL in the signaling message transmitted to the called party to establish the IP call. In turn, the called party could include an associated URL in the signaling message sent in response to signaling sent by the calling party. Each party receiving a URL from the other would then retrieve the multimedia information corresponding to the URL. The retrieved multimedia information is presented to the party, by way or audio reproduction for audio information, and by a video display for video or text information.

BRIEF DESCRIPTION OF THE DRAWINGS

FIG. 1 is a block schematic diagram of a telecommunications network in accordance with a first embodiment of the invention for providing multimedia information to at least one of the parties to a call;

DETAILED DESCRIPTION

Figure 2A:
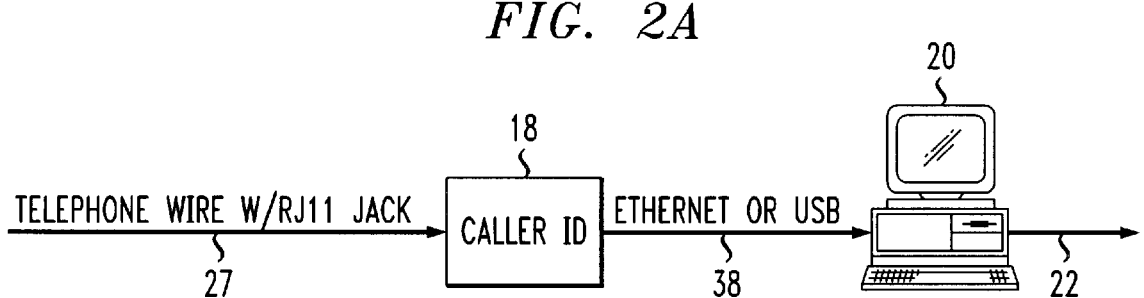
FIG. 2A shows a caller identification box and computer comprising part of the network of FIG. 1 for presenting the multimedia information.

FIG. 1 depicts a first embodiment of a telecommunications network 10 in accordance with the invention for providing multimedia information to one or more the parties to a telephone call, as represented by calling party 12 and called party 14. In the embodiment of FIG. 1, the calling and called parties 12 and 14, respectively each possess a telephone set 16, a caller identification device 18 and a multimedia terminal 20, typically a personal computer, having access to the Internet through a link 22 which may comprise a dial-up link, a cable television link, or other data connection.

The network 10 includes Local Exchange Carrier (LEC) networks 24 and 26 that provide local telephone service (dial tone) to the calling and called parties 12 and 14, respectively though links 27 and 28. Each of links 27 and 28 connect both the telephone set 16 and the caller identification device 18 of a respective one of the calling and called parties 12 and 14 to the LEC networks 24 and 26, respectively. (In the event that the calling and called parties 12 and 14 reside in close proximity to each other, both parties could receive local service from the same LEC network). When the LEC networks 24 and 26 lie in different Local Access and Transport Areas (LATA), then a long distance network 29, such as the long distance network of AT&T, will transport calls from one LEC network to the other.

In accordance with the invention, a call launched by the calling party 12 to the called party 14, when initially received at the LEC network 24, triggers a query by that LEC network to a first associated database 30. The database 30 contains records for subscribers that subscribe to a service that allows subscribers to exchange multimedia information. Each record within the database 30 contains at least one Universal Resource Locator (URL) that identifies multimedia information associated with a particular subscriber. The subscriber's telephone number serves to index the subscriber's record in the database 30. Using Automatic Number Identification, the LEC network 24 can identify the telephone number of the calling party, and thereafter query the database 30 to obtain the calling party's associated URL. After retrieving the calling party's URL, the LEC network 24 passes the URL in a caller identification message to the LEC network 26 for ultimate receipt by the called party 14 via that party's caller identification device 18. As shown in FIG. 1, the computer 20 associated with the called party 14 will receive the URL from the caller identification device 18. After receiving the URL, the called party's computer 20 will then retrieve the associated multimedia information from the Internet via link 22.

While the computer 20 typically enjoys a direct link with the caller identification device as described in greater detail with respect to FIG. 2A, there need not be a direct link to practice the invention. The called party 14 could manually enter the URL into the computer 20 after observing the URL displayed on the caller identification device 18 and thereafter retrieve the corresponding multimedia information.

In a similar fashion, when the LEC network 26 receives a call directed to the called party 14, that LEC network will launch a query to a database 32, which like database 30, contains records of subscribers that subscribe to the service affording sharing of multimedia information. (The LEC networks 24 and 26 could share a single database, rather than each network having its own database.) If the called party 14 subscribes to the service, the database 32 will return the called party's URL to the LEC network 26 as a caller identification message for transmission to the LEC network 24. The LEC network 24 sends that information to the calling party 12 on the calling party's caller identification device 18. If the computer 20 associated with the calling party 12 enjoys a direct link to the caller identification device associated with that party, the computer will automatically retrieve the multimedia information identified by the received URL from the Internet. Otherwise, the calling party 12 will have to manually enter the URL to the computer 20 to retrieve the associated multimedia information.

In the above-described embodiment of the invention, both the calling and called parties 12 and 14 subscribe to the multimedia information sharing service. However, there is no need for both the calling and called party to subscriber. Consider the scenario when the calling party 12 launches a call to a called party 34 served by the LEC network 26. The called party 34 may wish to share its multimedia information with the calling party 12, but may lack the ability to receive and process the URL from the calling party. Under such circumstances, the LEC network 24 would not send (or the LEC network 26 would suppress) the URL of calling party 12 to the called party 34. However, the LEC network 26, upon receiving the call from the called party 12, would forward the URL of the called party 34 as a caller identification message to the calling party 12.

As described in connection with the embodiment of FIG. 1, the computer 20 associated with each party accesses the Internet through the link 22. However, if one of the parties enjoys ISDN or DSL service from its associated LEC network, then such link could support both voice and data, thus allowing the computer 20 to access the Internet without the need for the link 22.

FIG. 2A shows the combination of the caller identification device 18 and the computer 20 utilized by each of the calling and called parties 12 and 14, respectively of FIG. 1. The caller identification device 18 receives the caller identification signal via the link 27 that typically comprises a conventional telephone line also carrying telephone signals to the telephone set 16. Upon receipt of the caller identification message transmitted on the link 27, the caller identification device 18 provides the URL to the computer 20, typically via an Ethernet or USB link 38 to allow the computer 20 to access the Internet via link 22 to retrieve the multimedia information that corresponds to the URL. The computer 20 will then present the multimedia information. In the case of video information, the computer 20 will display the information on its monitor. One or more speakers (not shown) connected to the computer will reproduce any audio information.

Figure 2B:
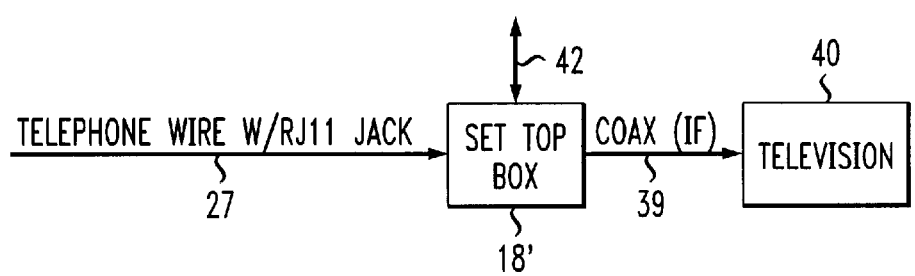
FIG. 2B shows a set-top box and television set for use in place of the caller identification device and computer of FIG. 2A.

FIG. 2B shows an alternate arrangement for enabling a party to retrieve me URL of another party. As shown in FIG. 2B, a set top box 18' could perform the translation function performed by the caller identification device 18 of FIGS. 1 and 2A. In other words, the set-top box 18' of FIG. 2B could receive the URL in the caller identification message transmitted on the link 27 and translate the message into a video signal transmitted through a coaxial cable link 39 connected to a television set 40 to allow display of the URL on the television set.

The set-top box 18', in its normal mode, demodulates RF signals received on a cable television link 42 to provide the television set with a single RF channel. A character generator (not shown) within the set-top box 18' will superimpose the URL either on the currently displayed channel, or on a separate, specially designated channel. When the viewer subscribes to Internet access over cable, the set-top box 18' could access the Internet via such service and retrieve the multimedia information associated with the URL received on the telephone link. The television set 40 would then serve to display the multimedia information corresponding to the received URL.

Figure 3:
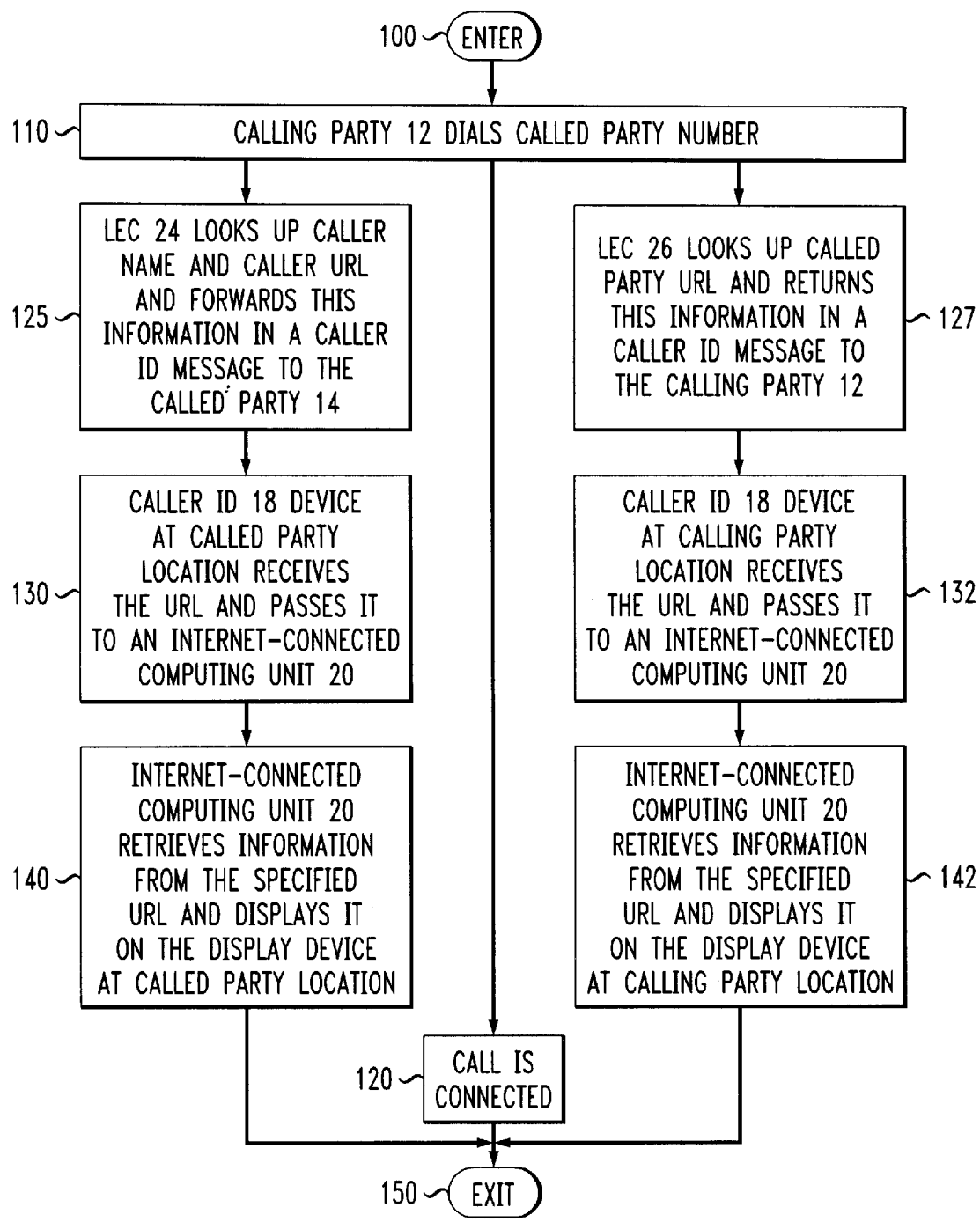
FIG. 3 depicts in flow chart form the steps of a method executed by the network of FIG. 1 for providing multimedia information to at least one of the parties to a call.

FIG. 3 depicts in flow chart form the steps performed to share multimedia information between the calling and called parties 12 and 14, respectively, of FIG. 1. The logic flow begins upon entry (step 100). Thereafter, the calling party 12 dials the telephone number of the called party 14 (step 110). If the called party 14 answers, the call is connected (step 120). As described previously, during set up of the call, the LEC 24 serving the calling party 12 of FIG. 1 queries the database 30 to look up the URL of the calling party and forwards this information in a caller ID message to the called party 14 (step 125). Upon receipt of that information, the LEC 26 serving the called party 14 of FIG. 1 queries the database 32 to look up the URL of the called party and forwards this information in a caller ID message to the calling party 12 (step 127). The caller identification device 18 of the called party 14 receives the URL of the calling party and passes the URL to the called party's computer 20 (step 130). Similarly, the caller identification device 18 of the calling party 12 receives the URL of the called party and passes the URL to the calling party's computer 20 (step 132). The called party's computer 20 retrieves the multimedia information corresponding to the calling party's URL and presents that information to the called party (Step 140). Likewise, the calling party's computer 20 retrieves the multimedia information corresponding to the called party's URL and presents that information to the calling party (Step 142). Thereafter, the process exits (step 150).

Figure 4:
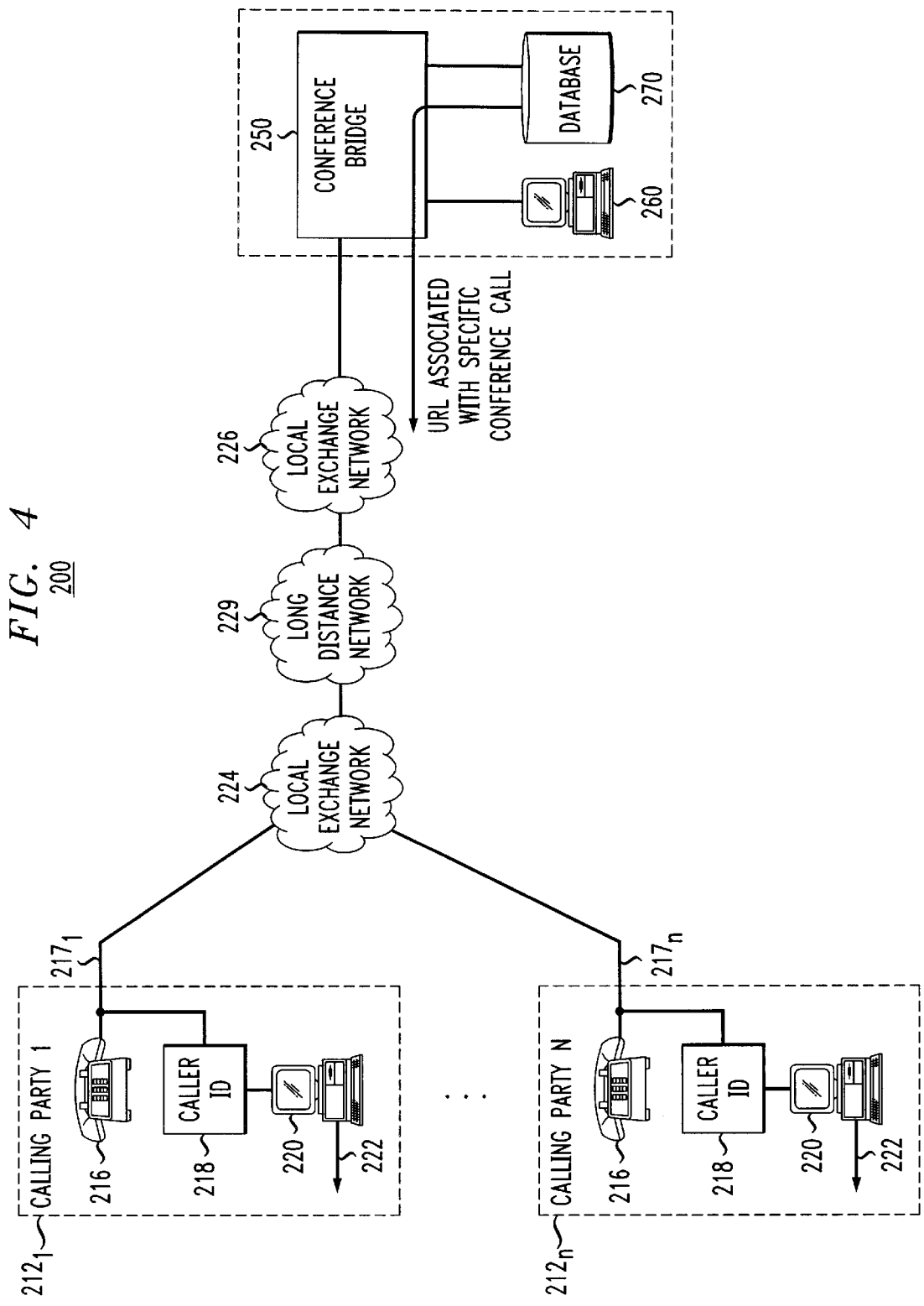
FIG. 4 is a block schematic diagram of a telecommunications network in accordance with a second embodiment of the invention for providing multimedia information to at least one of the parties to a call.

FIG. 4 depicts a block schematic diagram of a second embodiment 200 of a telecommunications network in accordance with the invention for enabling the receipt of multimedia information by one or more calling parties $212_1 \ldots 212_n$ (where n is an integer) related to a particular teleconference call dialed by each party. Like the calling party 12 of FIG. 1, each of the calling parties $212_1 \ldots 212_n$ of FIG. 4 possess a telephone set 216, a caller identification device 218 and a multimedia terminal 220, typically a personal computer, having access to the Internet through a link 222 similar to the link 22 of FIG. 1. Each of the calling parties $212_1 \ldots 212_n$ receives local telephone service (dial tone) from a LEC network 224 via a respective one of links $217_1$–$217n$. In the illustrated embodiment of FIG. 4, the calling parties each receive local service from the same LEC network 224. However, some or all the calling parties $212_1 \ldots 212_n$ could receive local service from different LEC networks.

To enter a particular conference call, each of the calling parties $212_1 \ldots 212_n$ dials the telephone number of a conference bridge 250 that enjoys a link to a LEC network 226. If the LEC networks 224 and 226 lie in different LATAs, then a long distance (Inter-Exchange) network 229 serves to transport calls between the LEC networks. (Note that the conference bridge 250 could receive local service from the same LEC network 224 as one or more of the calling parties $212_1 \ldots 212_n$.) As described in greater detail with respect to FIG. 5, upon receipt of a call dialed by one of the called parties $212_1 \ldots 212_n$ to join a particular conference call, the conference bridge 250, under the control of a computer 260, will query a database 270 containing records for the different conference calls carried by the conference bridge. Each record contains at least one URL associated with a particular conference call and each record is indexed by a corresponding password assigned to the particular conference call. When a calling party dials the conference bridge 250 to join a particular conference call, the conference bridge will return to the calling party the URL associated with that conference call. The calling party receives the URL in the form of caller identification message for receipt on its associated caller identification device 218. The computer 220 at each calling party premises receiving the URL then accesses the Internet to retrieve the corresponding multimedia information associated with the particular conference call dialed by the calling party.

Figure 5:
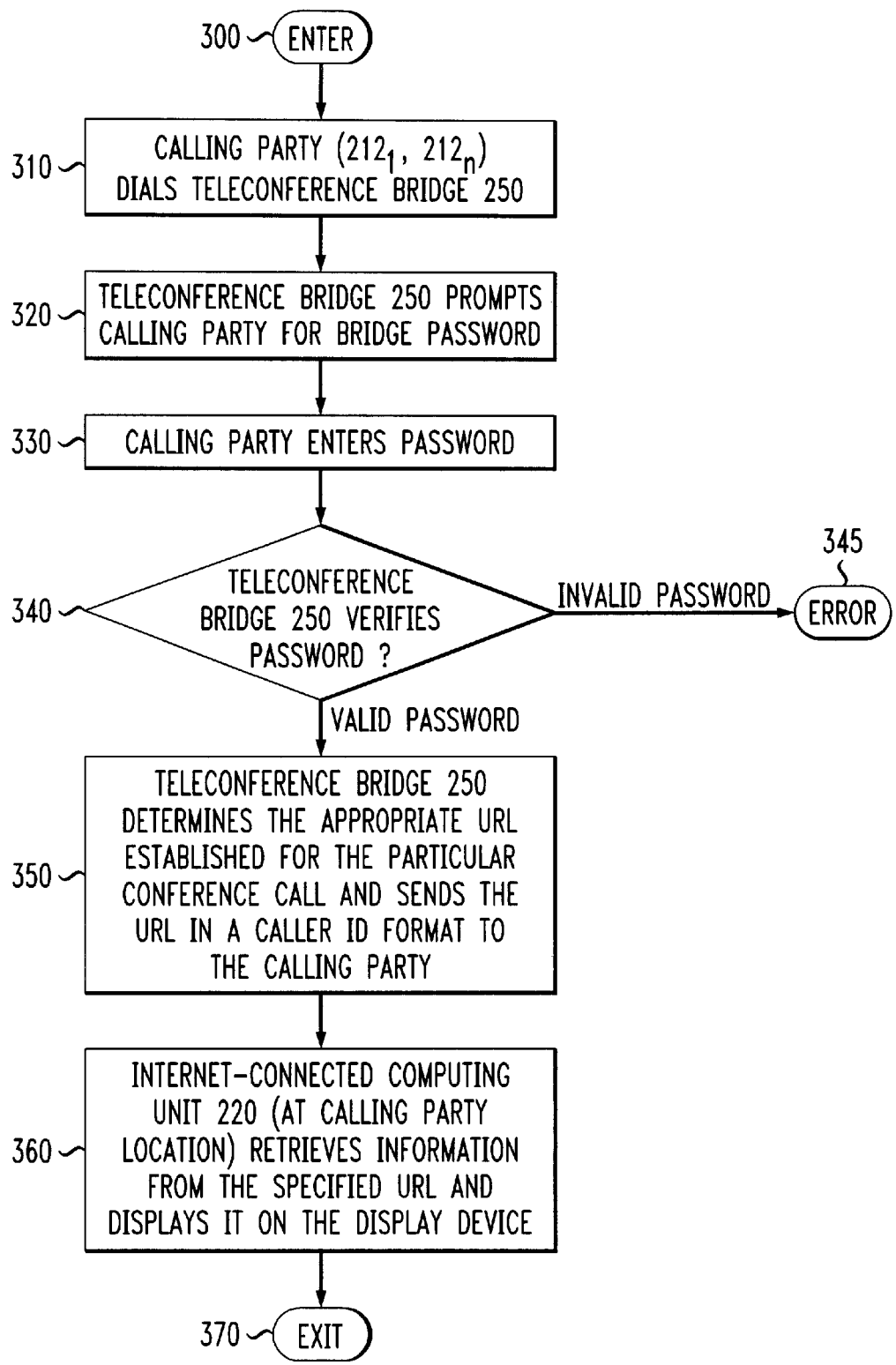
FIG. 5 depicts in flow chart form the steps of a method executed by the network of FIG. 4 for providing the multimedia information.

FIG. 5 depicts in flow-chart form the steps performed to provide the calling parties $212_1 \ldots 212_n$ with multimedia information associated with the particular teleconference call dialed by each party. The logic flow begins upon entry (step 300). Thereafter, each calling party dials the telephone number of the conference bridge 250 of FIG. 4 during step 310 of FIG. 5. Upon receipt of the call, the conference bridge prompts the caller for the bridge password (access code) associated with a particular conference call (step 320). The calling party then enters the password (step 330). The teleconference bridge 250 verifies whether the password is valid during step 340. If calling party has entered an invalid password, the conference bridge 250 signals an error condition during step 345. Although not illustrated in FIG. 5, upon detecting an invalid password, the conference bridge 250 of FIG. 4 could once again re-execute step 320 to prompt the calling party for a password, or alternatively terminate the call if the calling party has failed to enter the correct password after a prescribed number of attempts. Upon verifying the password, the conference bridge 250 then determines the appropriate URL for the particular conference call during step 350 by querying the database 270 using the password entered by the calling party to index the record associated with that conference call. The conference bridge 250 then sends the URL to the calling party in the form of a caller identification message for receipt at the calling party's caller identification device 218 of FIG. 4. Upon receipt of the URL, the computer 220 at the calling party's premises retrieves the multimedia information from the Internet (step 360) whereupon the process exits (step 370).

Figure 6:
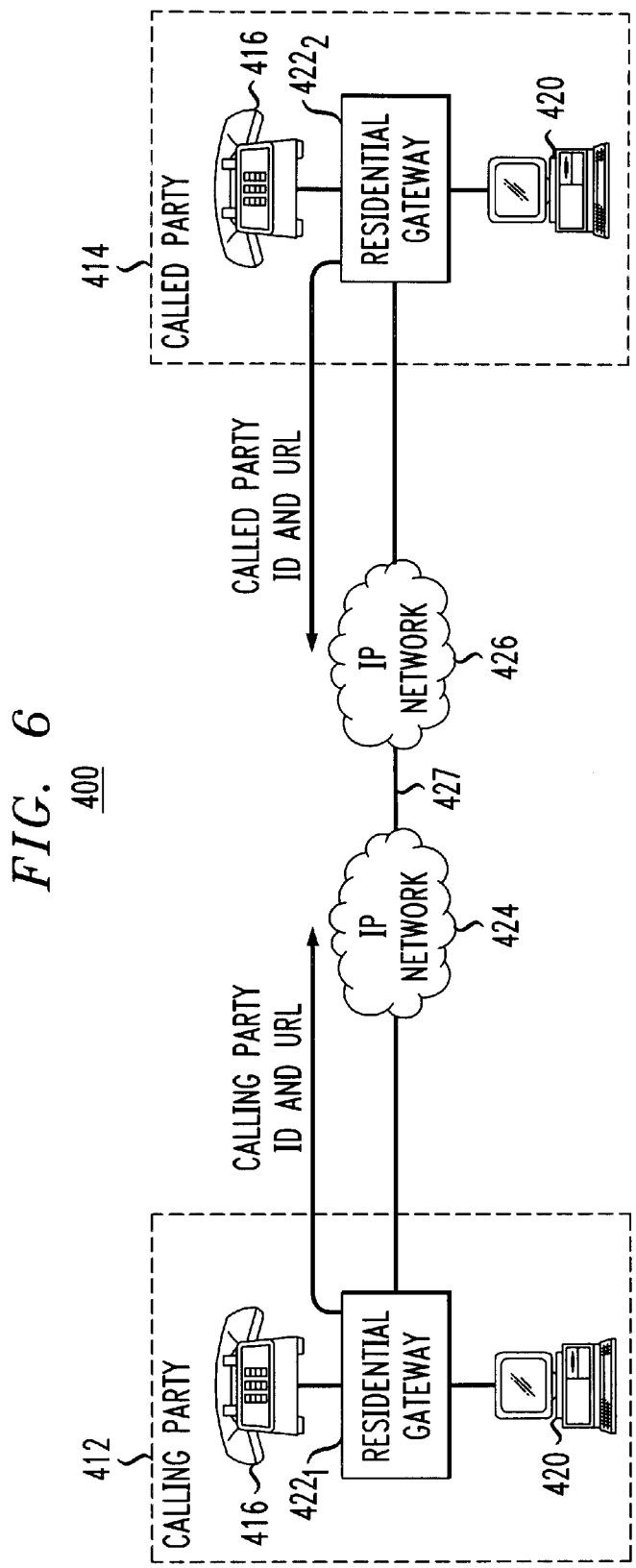
FIG. 6 is a block schematic diagram of a telecommunications network in accordance with a third embodiment of the invention for providing multimedia information to at least one of the parties to a call.

FIG. 6 depicts a third embodiment of a telecommunications network 400 in accordance with the invention for enabling the receipt of multimedia information by at least one of the parties to an Internet Protocol (IP) telephone call, as represented by calling and called parties 412 and 414 respectively. In the embodiment of FIG. 6, the calling and called parties 412 and 414 each have an associated telephone set 416 and a computer 420. The telephone set 416 and computer 420 of the calling party 412 each enjoy a connection to a first residential gateway $422_1$ connected to a first IP network 424, whereas the telephone set 416 and computer 420 of the called party 412 each enjoy a connection to a second residential gateway $422_2$ connected to a second IP network 426. The IP networks 424 and 426 are connected via a link 427. (Depending on their geographic proximity to each other, the calling and called parties 412 and 414 could both receive service from the same residential gateway, or if connected to separate gateways, both could receive service from a single IP network.)

Figure 7:
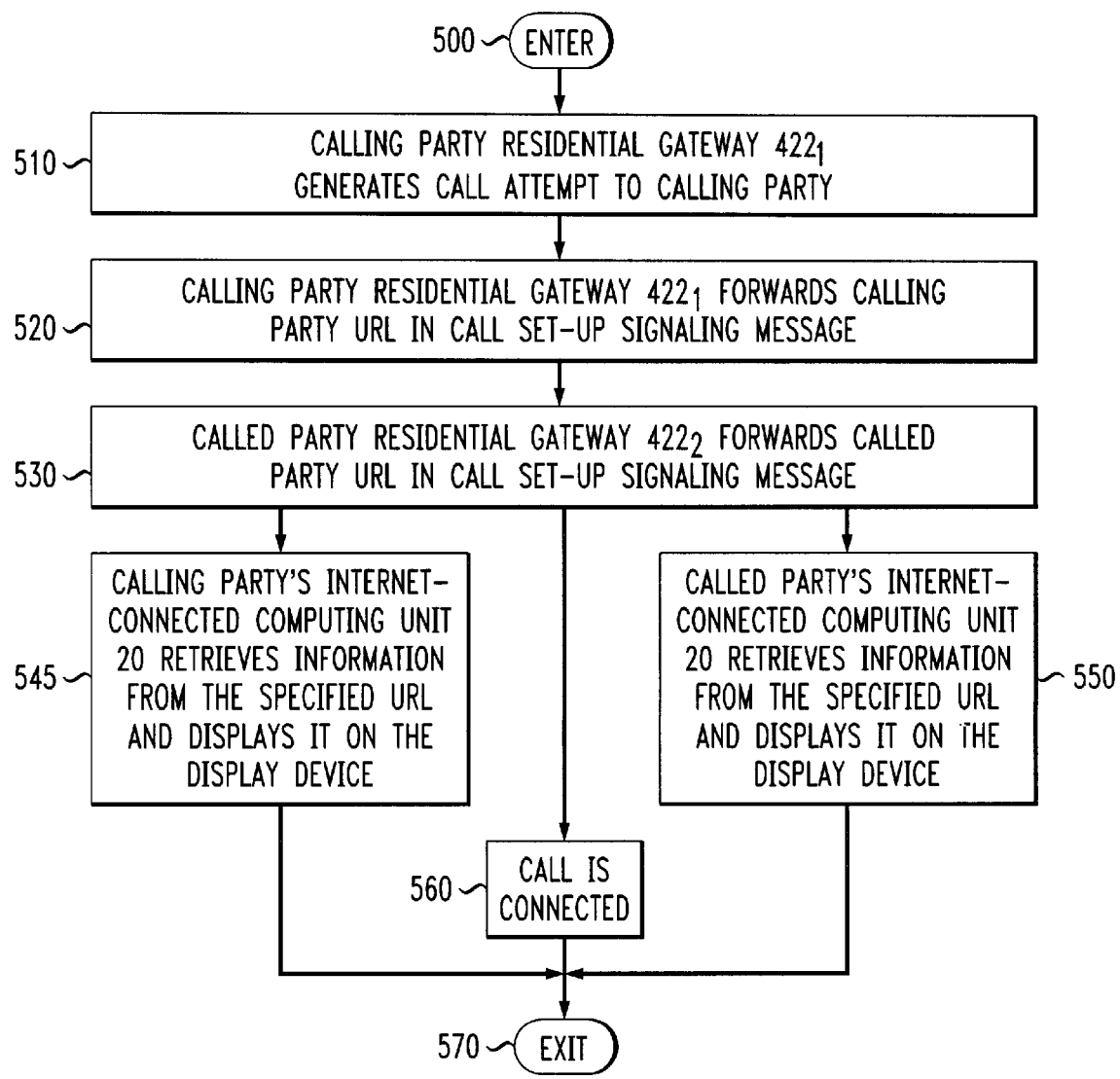
FIG. 7 depicts in flow chart form the steps of a method executed by the network of FIG. 6 for providing the multimedia information.

As discussed in greater detail with respect to FIG. 7, the calling party 412 launches a call to the called party 414, either by dialing the telephone number via the telephone set 416, or by entering the appropriate IP address (or other identifying information, such as a Fully Qualified Domain Name) through the computer 420. Upon receipt of this attempt by the calling party 412 to call the called party 414, the residential gateway $422_1$ will set up the call by sending appropriate signaling information to the called party's residential gateway $422_2$ via the IP networks 424 and 426. The signaling information sent by the residential gateway $422_1$ includes both the identity of the calling party 412, as well as the calling party's URL. Upon receipt of the call attempt from the calling party 412, the residential gateway $422_2$ of the called party 414 will respond with the called party's identification and URL. Upon receipt of the URL, each of the calling and called party's computers 420 will retrieve from the Internet the corresponding multimedia information.

FIG. 7 depicts in flow-chart form the steps performed to enable the calling and called parties 412 and 414 of FIG. 6 to exchange multimedia information. The logic flow begins upon entry (step 500). Thereafter, the calling party 412 signals its residential gateway $422_1$ to attempt a call to the called party 414 (step 510). In response to the call attempt by the calling party 412, the residential gateway $422_1$ forwards a signaling message to the residential gateway $422_2$ of the called party 414 that includes the URL of the calling party (step 520). In response to the signaling message from the calling party's residential gateway $422_1$, the called party's residential gateway $422_2$ forwards the called party's URL in the return signaling message (step 530). The calling party's computer 20 retrieves the multimedia information corresponding to the called party's URL during step 545, while called party's computer 20 retrieves the multimedia information corresponding to the calling party's URL during step 550. Thereafter, the call placed by the calling party is connected (step 560), whereupon the process exits (step 570.

The foregoing describes a process for enabling at least one of the parties to a telephone call to exchange multimedia information with at least one other party.

The above-described embodiments merely illustrate the principles of the invention. Those skilled in the art may make various modifications and changes that will embody the principles of the invention and fall within the spirit and scope thereof.

What is claimed is:

1. A method for providing multimedia information to at least one of a calling and called parties to a telephone call, comprising the steps of:

receiving, in a telecommunications network, a telephone call launched by the calling party to the called party;

establishing, for the called party, at least one Universal Resource Locator (URL) that identifies multimedia information associated with said called party;

communicating said at least one URL to the calling party and displaying said at least one URL as a visual message for said calling party;

retrieving the multimedia information identified by said at least one URL; and providing said multimedia information to said calling party.

2. The method according to claim 1 wherein the URL for the called party is established by querying a database associated with the called party.

3. The method according to claim 2 wherein the called party comprises a teleconference bridge and wherein the URL for said called party is established by querying the database in accordance with a password entered by a calling party to gain access to a particular conference call.

4. The method according to claim 1 wherein a URL is established for the called party via a signaling message transmitted through the network from the called party to the calling party in response to the signaling message transmitted by the calling party.

5. The method according to claim 1 wherein the multimedia information is obtained by accessing the internet via a computer associated with said calling party.

6. The method according to claim 1 wherein the multimedia information is provided, at least in part, by displaying video information on a monitor associated with said calling party.

7. The method according to claim 1 wherein the multimedia information is provided, at least in part, by reproducing audio information on a audio reproduction device associated with said calling party.

8. The method according to claim 1 wherein the multimedia information is retrieved automatically following receipt by said calling party of the at least one URL associated with the called party.

9. The method according to claim 1 wherein the multimedia information is retrieved manually following receipt by said calling party of the at least one URL associated with the called party.

10. The method according to claim 1 wherein each party's URL is displayed to the other party as a caller identification message.

11. The method according to claim 1 wherein each party transmits its URL to the other party as a caller identification message.

12. A method for providing multimedia information to the calling and called parties to a telephone call, comprising the steps of:

receiving, in a telecommunications network, a telephone call launched by the calling party to the called party;

establishing, for each of the calling and called parties, at least one Universal Resource Locator (URL) that identifies multimedia information associated with the calling and called parties, in accordance with telephone numbers of the calling and called parties, respectively;

transmitting the URL of the calling and called parties to the called and calling parties, respectively;

displaying the transmitted URLs on display devices associated with the called and calling parties;

retrieving the multimedia information identified by the URL of the calling and called parties; and providing said multimedia information corresponding to the calling and called party's URL to the called and calling parties, respectively.

13. The method according to claim 12 wherein the calling and called party's URLs are established via signaling messages exchanged by the calling and called parties, respectively, to set-up an Internet Protocol Telephone Call.

14. The method according to claim 12 wherein the multimedia information is provided, at least in part, by displaying video information on a monitor.

15. The method according to claim 12 wherein the multimedia information is provided, at least in party, by reproducing audio information on an audio reproduction device.

16. The method according to claim 12 wherein the multimedia information is retrieved automatically following receipt of the URL.

17. The method according to claim 12 wherein the multimedia information is retrieved manually following receipt of the URL.

18. The method according to claim 12 wherein each party's URL is displayed to the other party as a caller identification message.

19. The method according to claim 12 wherein each party transmits its URL to the other party as a caller identification message.

* * * * *